Oct. 12, 1926.  1,602,927
F. S. O'NEIL
CHAIN LINK
Filed August 24, 1925
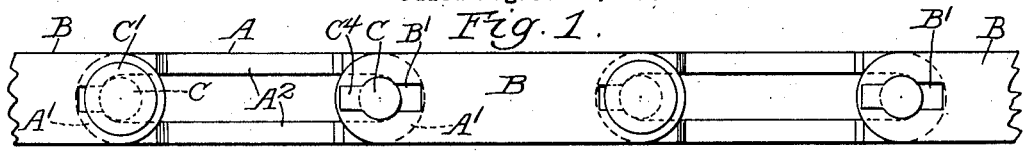
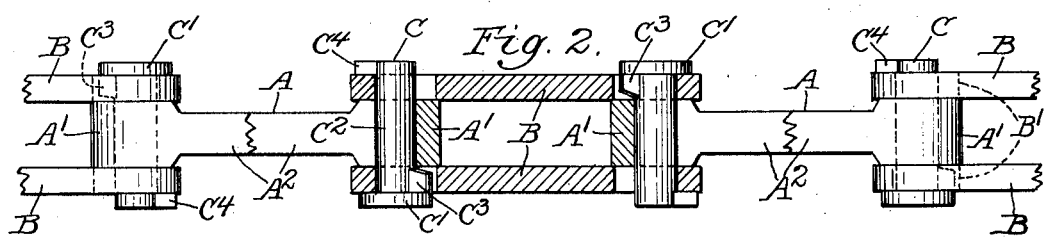
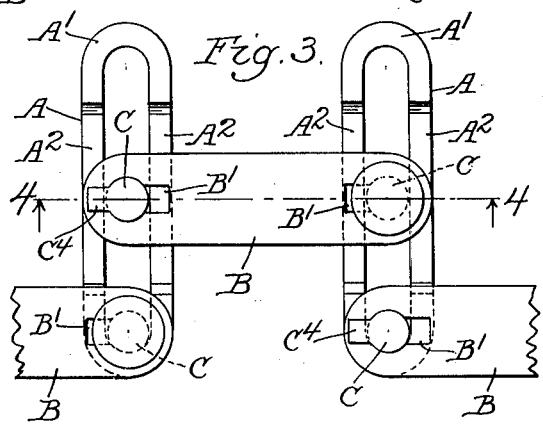
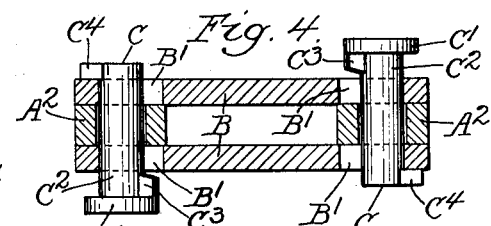
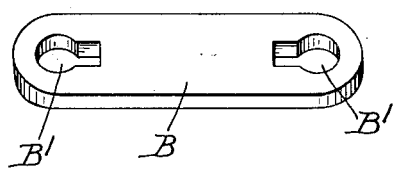
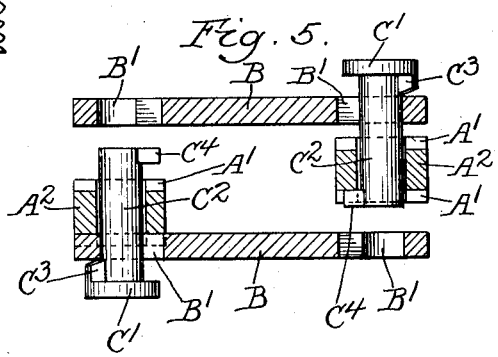
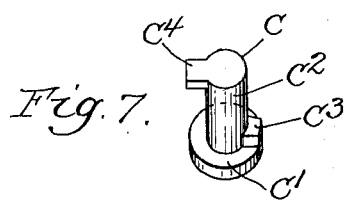
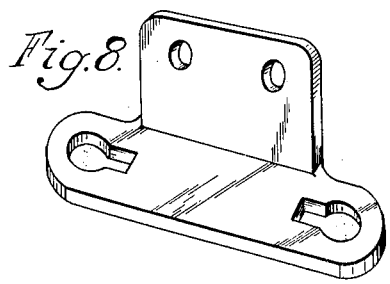
Inventor
Frank S. O'Neil
by Parker & Carter
Attorneys.

Patented Oct. 12, 1926.

1,602,927

UNITED STATES PATENT OFFICE.

FRANK S. O'NEIL, OF INDIANAPOLIS, INDIANA, ASSIGNOR TO LINK-BELT COMPANY, OF CHICAGO, ILLINOIS, A CORPORATION OF ILLINOIS.

CHAIN LINK.

Application filed August 24, 1925. Serial No. 51,928.

My invention relates to an improvement in chains and particularly to an improvement in sprocket chains having or including assembly links. One object of my invention is to provide a cheap and easily constructed chain. Another object is the provision of an assembled chain having a minimum number of different parts. Another object is the provision of a chain having assembled links which are normally locked against disassembly during use but which are easily taken down when desired. Other objects will appear from time to time throughout the specification and claims.

I illustrate my invention more or less diagrammatically in the accompanying drawings wherein—

Figure 1 is a side view;

Figure 2 is a plan view with parts in section;

Figure 3 is a side view illustrating the demounting of a chain link;

Figure 4 is a section on the line 4—4 of Figure 3;

Figure 5 is a section similar to Figure 4 after the parts of a link have been partially separated;

Figure 6 is a perspective of a link side member;

Figure 7 is a perspective of the link pin; and

Figure 8 is a perspective of a link side member modified to receive attachments.

Like parts are characterized by like characters throughout.

The chain is formed of two types of links, of which one is a closed link A, of a suitable material, for example cast material or forging, which has at each end an enlarged portion or bend $A^1$ of greater thickness than the intermediate or side section $A^2$.

The assembled links consist each of a pair of identical side members B each having at each end the keyhole shaped aperture $B^1$. These side bars are preferably made from bar stock but may be made of any suitable material or by any suitable process, on a punch press or otherwise.

The side bar members B are connected by cross pins, generally denoted as C each consisting of a head $C^1$, a shaft $C^2$, and outwardly projected stop or lug $C^3$ on the head $C^1$ and a diametrically opposed lug $C^4$ outwardly projecting from the stem $C^2$ at the end opposite the head $C^1$.

The chain links are assembled as follows: Referring to Figures 3, 4 and 5, the assembled chain member which has enjoined two of the closed links A is formed by aligning two of the side members B, one on each side of the links A where they join. As shown in Figures 3 and 4, they are placed in engagement with the opposite sides of the thin portions $A^2$ of the said links. A pin C is then passed through each end of the pair of members B with the head of one pin facing in one direction and the head of the other pin facing in the opposite direction. The pins are applied to the key hole apertures $B^1$ with the lugs $C^4$ fitting in the restricted portion of the aperture. The thickness of the portion $A^2$ of the link A permits the pins to be inserted and to be turned to bring the lug $C^4$ out of alignment with the key hole aperture as shown at the ends of Figure 4. This rotation aligns the lug $C^3$ with the key hole aperture and when the side members B are drawn apart the lug seats in the aperture and prevents rotation of the pin. However, in normal use of the chain the thickened portions $A^1$ of the links A will normally engage the pins and will space the side members B apart thus holding the pins locked against rotation and thus maintaining the assembly of the link.

It will be realized that whereas I have illustrated a practical and operative device that nevertheless many changes may be made in the size, shape, number and disposition of parts without departing materially from the spirit of my invention. I therefore wish my drawings and description to be taken as in a broad sense illustrative rather than as limiting me to my specific showing.

The use and operation of my invention are as follows:

I provide a chain in which each pair of the closed links are connected by an assembled link. The assembled link consists of two identical side portions B identically apertured at each end, the members B being joined by two identical pins C.

The chain requires but three different parts, namely, the closed links A, the side bars B and the pins C. The closed links may be formed of malleable iron and may for example be drop forged. The side bars may be forged but are preferably formed on a punch press from strip or bar stock. The pins may be made from malleable iron or steel from round stock and may be drop forged or headed upon a heading machine.

The result is an extremely cheap and easily made chain which eliminates any substantial finishing of the parts.

A further advantage is the easy interchangeability of the links. It is customary to use the type of chain herein illustrated with various conveying or operating attachments, the details of which form no part of the present invention. It is obvious that each individual side member may have substituted for it any suitable attachment, provided only that the attachment include a side member properly apertured to receive the pins C¹.

I claim:

1. An assembled chain link comprising a pair of identical flat side bar elements, each provided with a keyhole shaped aperture at each end, the tails of the keyhole apertures facing each other, a pin penetrating each of said side bars at each end of the link, a head on one end of each pin, a lock lug associated with said head and projecting axially from the pin, and a second lock lug diametrically opposed to the first, outwardly projecting from the opposite end of the pin.

2. An assembled chain link comprising a pair of identical flat side bar elements, each provided with a keyhole shaped aperture at each end, the tails of the keyhole apertures facing each other, a pin penetrating each of said side bars at each end of the link, a head on one end of each pin, a lock lug associated with said head and projecting axially from the pin, and a second lock lug diametrically opposed to the first, outwardly projecting from the opposite end of the pin, the cross section of the pin taken through the lock lugs being substantially identical with the cross section of the apertures.

3. An assembled chain link comprising a pair of identical flat side bar elements, each provided with a keyhole shaped aperture at each end, a pin penetrating each of said side bars at each end of the link, a head on one end of each pin, a lock lug associated with said head and projecting axially from the pin, and a second lock lug diametrically opposed to the first, outwardly projecting from the opposite end of the pin.

4. An assembled chain link comprising a pair of identical flat side bar elements, each provided with a keyhole shaped aperture at each end, the tails of the keyhole apertures facing each other, a pin penetrating each of said side bars at each end of the link, a head on one end of each pin, a lock lug associated with said head and projecting axially from the pin, and a second lock lug outwardly projecting from the opposite end of the pin.

5. A chain comprising alternate apertured integral and assembled links, each integral link including end portions of greater thickness than the intermediate portions, each assembled link comprising a pair of identical side bar elements flat on each side, each flat side bar element being provided with an irregularly shaped aperture at each end, each such aperture including a portion of circular cross section and a portion projecting outwardly beyond the periphery of such circle, a pin penetrating each of said side bars at each end of the link and passing through the central aperture of the integral link, a head on one end of each such pin, a lock lug associated with said head and projecting axially from the pin, and a second lock lug, out of line with the first, outwardly projecting from the opposite end of the pin, both lock lugs conforming generally in cross section to the outwardly projecting portion of the apertures.

Signed at Indianapolis county of Marion and State of Indiana, this 11th day of August 1925.

FRANK S. O'NEIL.